United States Patent [19]
Silverstein

[11] 4,000,364
[45] Dec. 28, 1976

[54] REGULATED PULSED CURRENT TELEGRAPH ADAPTER

[75] Inventor: Samuel Chaim Silverstein, Monsey, N.Y.

[73] Assignee: Western Union Teleprocessing, Inc., Mahwah, N.J.

[22] Filed: Nov. 24, 1975

[21] Appl. No.: 634,590

[52] U.S. Cl. .................................. 178/3; 178/70 R
[51] Int. Cl.² .......................................... H04M 1/26
[58] Field of Search ............... 178/68, 2 R, 2 A, 3, 178/4.1 R, 4.1 C, 74, 69 R, 69 A, 58 R, 70 R, DIG. 11; 307/239, 264; 328/164; 323/22 T

[56] References Cited
UNITED STATES PATENTS

| | | | |
|---|---|---|---|
| 3,697,860 | 10/1972 | Baker | 323/22 T |
| 3,867,567 | 2/1975 | Herron et al. | 178/3 |

*Primary Examiner*—Thomas A. Robinson
*Attorney, Agent, or Firm*—Michael I. Borsella

[57] ABSTRACT

A regulated current pulse is generated for use in transferring digital data from low level voltage devices to those requiring substantially high current such as teletypewriters. By utilizing low voltage components, the current pulse level is continuously controlled, isolated from the low voltage source and applied to the load remotely located.

9 Claims, 2 Drawing Figures

REGULATED PULSED CURRENT TELEGRAPH ADAPTER

BACKGROUND OF THE INVENTION

The background of this invention resides in the field of telegraphy and data transmission. Heretofore, data transmission over wire facilities to a load such as a teleprinter or the like, at remote distances was accomplished by conventional voltage sources applied to the load by employing relays or solid state switches or equivalent devices.

Larger systems requiring many teleprinters at varying distances required an individual adjustment for each printer in order to achieve the prescribed current driving level for the given printer. The present invention on the other hand permits the prescribed current level to be adjusted one sole time for any distance in the magnitude of several kilometers.

In former systems, the high voltage supply powering the system had to be of high quality and constant output thereby expensive to a high degree. Otherwise, large fluctuations in the voltage, proportionately causing the current to the load to fluctuate, resulted in increased distortion and data errors from the loading device until the current was reset.

The present system is capable of operating efficiently with a high voltage system of much cheaper order as large fluctuations are compensated for in the novel regulator and cannot unbalance the system — no resetting is required.

Further, previous systems of this nature embodied a high voltage source electrically connected with the data transmitting components. The high voltage source was indispensable for driving the remote device. Such condition inherently generated shock producing potentials and caused a dangerous condition to operating personnel and possible damage to the data equipment.

The herein described novel system provides complete isolation of the high voltage source from the data components, and yet maintains a high degree of current control.

FIELD OF ART

The invention is applicable wherever a constant, or constant level, pulse current is required to power a remote device.

One such application is for a computer or switching center that transmits data to a plurality of teleprinters situated at various distances of the order of several kilometers away.

Another application would be the transmission of direct current supply power to remotely located repeater amplifiers. Similarly, a situation such as the powering of hydrophone equipment where the attaching power conducting cables vary in length, would be serviced by such a current regulator.

By suitably adding an analog input data source to the current-set control lead within the herein described invention, and by omitting the pulse data from the pulse data input port, the device becomes a highly linear medium current amplifier/driver. In addition, if the pulse data input port were used under such conditions the device could be applied to advantage in multiplexing operations, and as the front end of an RF modulator.

The foregoing and additional applications which will readily be apparent to those skilled in the art may be made without departing from the breadth and scope of the invention.

SUMMARY OF THE INVENTION

The invention accomplishes the regulation of a current supplied to a load remotely located from the voltage driving source which also powers the regulation units.

An unregulated voltage driving source is connected to a pass transistor through a relatively small sensing resistor and appropriate zener diodes — a loop amplifier floats off the unregulated high voltage supply and compares the current sensor output to a preset level that similarly floats from the high voltage unregulated supply. The loop amplifier in turn controls the pass transistor. An optical isolator is employed to saturate the amplifier thereby pulsing the pass transistor.

The output of the pass transistor is directly applied to the load. The load current setting is responsive to a preset level by an operator as in a current power supply.

The novel in the above summarized invention resides in the manner in which the loop amplifier is connected to the high voltage unregulated supply, and the manner in which the loop is effectively opened during the current pulse "off time" of the pass transistor.

The above and other points of novelty taught by this invention will be more readily apparent from the detailed description of a preferred embodiment of the invention which subsequently is set forth.

DESCRIPTION OF PREFERRED EMBODIMENT

Figure 1:
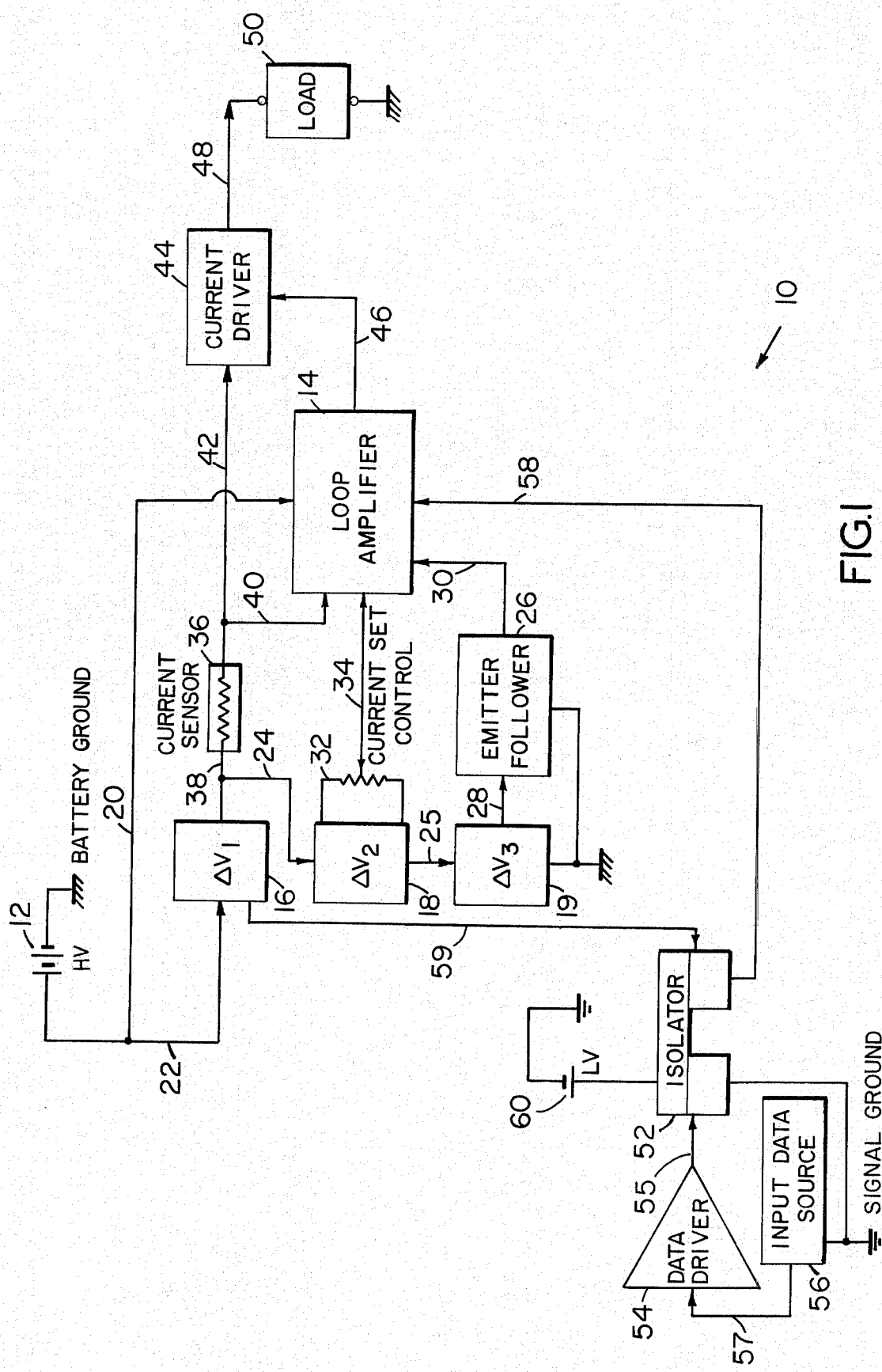
FIG. 1 is a general block diagram of the (invention) regulated pulse telegraph adapter.

Referring to FIG. 1 there is shown a complete block diagram of the regulated pulse telegraph adapter generally designated by the numeral 10.

The adapter 10 comprises a conventional high voltage (HV) power source 12 of suitable value, connected to the positive power port of a loop amplifier 14 by means of lead 20, and to a series of zener diodes 16, and 18 and 19, by means of leads 22 and 24 and 25.

The diodes 16 and 19 are of a conventional type using silicon oxide passivated junctions, while the diode 18 is synthesized using transistors and resistors in a monolithic integrated circuit such as an LM 113 reference diode which may be found in National Semiconductors Corp., linear integrated circuits catalog, or the like.

As will be hereinafter discussed more in detail, the temperature, stability, low breakdown voltage and dynamic impedance of the diode 18 are critical to the operation of the device.

The diode 19 is in turn connected to an emitter follower 26 by lead 28. The emitter follower 26 in turn is connected by means of lead 30, to the negative power port of the loop amplifier 14. The emitter follower 26 has a medium power dissipation requirement and may or may not be used in conjunction with a heat sink depending on the rating of the transistor embodied in the emitter follower.

A potentiometer 32 is connected to the diode 18.

The arm of the potentiometer 32 is in turn connected to a non-inverting input port of the loop amplifier 14 by means of lead 34.

A low value resistor 36 employed as a current sensor is connected between the diode 16 and the inverting input port of the loop amplifier 14 by means of leads 38 and 40, respectively. A lead 42 further connects the low value resistor 36 and the inverting input port of the loop amplifier 14 to the input of a current driver 44. The current driver 44 is in effect a high voltage power transistor and may or may not be required to operate in conjunction with a heat sink depending upon the characteristics of the transistor.

The loop amplifier 14 consists of two stages made up of a general purpose dual operational amplifier chip such as linear integrated circuit number 747 of the catalogue hereinbefore mentioned of National Semiconductors Corp. The first stage is operated in a differential mode and the second stage is operated as a buffer. The buffer output is the loop amplifier 14 output and is connected via lead 46 to the current driver 44. The output lead 46 provides the "current drive control" to the base of the power transistor in current driver 44.

The current driver 44 is normally connected by means of lead 48 to a load 50 which requires regulated current, such as a teleprinter or the like.

As later shown, when the current is set for a specified value a test jack 90 is utilized, which effectively breaks the connection between lead 48 and the driver and inserts a current meter between the two broken terminals. An optical isolator 52 driven by data driver 54 via lead 55, allows input data signals connected to the data driver via lead 57, from a low voltage pulsed data source 56 such as a computer or the like to control loop amplifier 14 in such a manner as to either cut off current driver 44, inhibiting current to the load 50 or driving current driver 44 with the required amount of drive thus permitting the precise amount of current previously set by means of potentiometer 32 to be delivered to the load 50. The optical isolator 52 output connects to the second stage of loop amplifier 14 by means of lead 58, and by means of lead 59 to zener diode 16.

Figure 2:
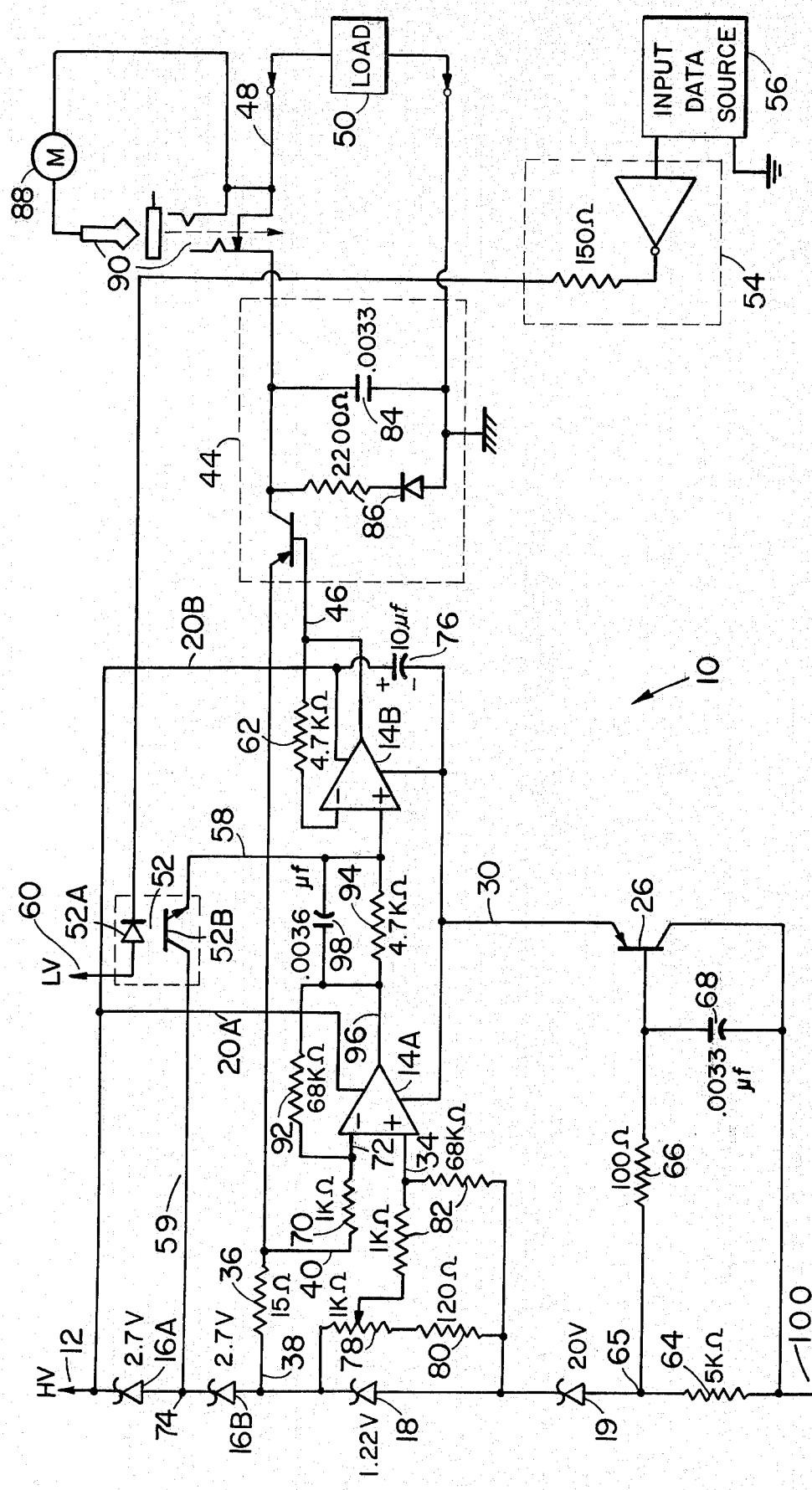
FIG. 2 is a schematic diagram of the invention showing the circuitry employed to continuously control the current pulse level by means of low voltage components while isolating the source, and applying the pulsed current to a remote load.

Referring now to FIG. 2 for a schematic diagram of the circuitry of the invention, we have a load 50 such as one or more teleprinters. The current to the teleprinters is regulated in the following manner. The base of the current driver pass transistor 44 is connected to the output of the second stage of the loop amplifier 14. This second stage 14b is configured as a voltage follower due to the fact that the inverting input is connected to the output through a resistor 62 here shown of 4.7k value. The input to amplifier 14b is a high impedance (non-inverting) port. A coupling resistor 94 (FIG. 2) embodied in the loop amplifier 14 (FIG. 1) applied to this input port couples signals from the first stage of amplifier 14, (amplifier 14a) to the input port of 14b and normally will carry little or no coupling current. The entire low voltage loop amplifier 14 is powered by connecting its positive power inputs 20a and 20b to the high side of the conventional high voltage power source 12.

The negative power input is connected by means of lead 30 to the emitter of emitter follower 26 which resides at a potential that is approximately 27 volts below that of the high side of the conventional high voltage power source 12. Said 27 volt value will be constant over a wide range of values for the conventional high voltage power source 12, as will be hereinafter set forth.

The conventional high voltage power source 12 supplies current to the zener diodes 16a and 16b (which comprise the zener diode 16 shown in FIG. 1), and zener diode 18 and zener diode 19 and resistor 64. The current through zeners 18 and 19 and resistor 64 is fairly constant for a given value of voltage of the source 12. Since the base of emitter follower 26 is essentially connected to the junction 65 of zener diode 19 and resistor 64, and the fact that the voltage drops through zeners 16, 18 and 19 are fairly constant over a wide current range with a total drop of approximately 27 volts, then the emitter 30 of emitter follower 26 is also approximately at this potential thus keeping the negative power input port of loop amplifier 14 at a fairly constant level of 27 volts below source 12 even with a wide variation in the voltage value of source 12.

Resistor 66 is inserted for base current limiting and together with capacitor 68 serve to stabilize the emitter follower against high frequency oscillations. The capacitor 76 across the power ports of the loop amplifier 14 further serves to keep this voltage at a relatively constant value.

The zener diode 18 is shunted by resistors 78, and 80 (FIG. 2) embodied in resistor 32 (FIG. 1). The total value of the resistors 78 and 80 being much larger than the effective resistance of diode 18 insures that said diode's tightly specified breakdown voltage of only 1.22 volts and temperature stability remain intact. The low stable value of 1.22 volts of zener 18 appears essentially across the potentiometer 78. Thus, the arm of potentiometer 78 is capable of delivering a stable reference voltage anywhere between the values of zero and approximately 1.22 volts as measured with respect to lead 38 connected to one side of the sensing resistor 36. This reference voltage embodied in the current set control appears at the non-inverting input port 34 of loop amplifier 14a via the resistor divider 82 (also embodied in potentiometer 32, FIG. 1).

Due to the low value of reference voltages employed as current set levels in this arrangement, the value of the resistor 36 employed as a current sensor can be very low, thus maximizing the compliance of the pulsed current adapter. The reason for the foregoing lies in the fact that due to the high Beta value of pass transistor 44, almost all of the current passing through sense resistor 36 is load current. The voltage drop with respect to lead 38 produced by the load current through the low value sensing resistor 36 can therefore be at a minimum value, thus maximizing the compliance. Lead 40 connects sensing resistor 36 to a summing resistor 70 which, in turn, is connected to the inverting input port of loop amplifier stage 14a by means of the remaining lead 72 of resistor 70. Thus, it will be observed that the difference between the small voltage drop across the sensing resistor 36 and the current set level voltage mentioned above is applied to the loop amplifier 14a. This difference is proportional to the drive at the base of the transistor 44.

Referring again to FIG. 2, a capacitor 84 (embodied in current driver 44 of FIG. 1) serves to stabilize the adapter 10, while the resistor-diode combination 86 (also embodied in the current driver of FIG. 1) serves to protect the regulator against inductive load transients should they exist.

Operation — "Current-On" Condition

During the time when current regulator 10 (FIG. 1) supplies current to the load 50, the input data source 56 is held at a level that is low relative to the low voltage power supply level 60 (LV). Thus, the output of the data driver-inverter 54 very nearly equals the level of low voltage power supply 60 insuring that approximately zero current flows through light emitting diode 52a, which is an integral part of the isolator 52. Under this condition, the photo detector transistor 52b, which is the remaining component of the isolator 52, may be considered to be essentially removed from the system 10.

Since the arm of the potentiometer 78 is adjusted until a meter 88 (in conjunction with a jack-assembly 90) indicates the desired current level, the small voltage drop across the sensing resistor 36 is essentially equal to the product of the indicated current level and the value of the small sensing resistor 36. The voltage difference between this product and the current set level as determined by potentiometer 78 is applied to loop amplifier 14a. The gain value of the operational loop amplifier stage 14a is essentially constant, being determined by the feedback resistor 92 and summing resistor 70. Operational amplifier stage 14b is configured in the well known unity-gain mode. Thus, the total gain for the loop amplifier 14 (as shown in FIG. 2) is in the order of 60 volts per volt, while that for the sense resistor 36 is 1/15 ampere per volt. With a minimum Beta value (at the applicable operating levels concerned) for transistor current driver 44 equal to 75 amperes per ampere, the total loop gain is in the order of 300 which is the product of the gains mentioned above. In theory, then, the voltage difference applied to loop amplifier 14a mentioned above is in the order of one three-hundredth the current set level determined by potentiometer 78 and produces (with an error of one three-hundredth the current set level implied by the setting of potentiometer 78) the necessary base drive for current driver 44 to result in said current value. In practice, due to the finite gains of loop amplifier 14 and non-linearity of current driver 44, the limiting regions will exhibit larger errors than the theoretical values expressed as in all practical servo loops.

The actual regulation is similar to that in conventional current supplies, as follows: A tendency for increased load current due to an increase in the load results in a tendency for a larger voltage drop across sense resistor 36 with respect to lead 38. This results in a tendency for a proportionately increased level at the output of amplifier 14a with respect to lead 38. This is due to the fact that the sum of the current set level which has not changed and the resultant voltage change across the current sense resistor 36 are applied to the input ports of amplifier 14a. This proportionately increased level is transmitted via the unity-gain amplifier 14b to the base of transistor current driver 44. The increased base level with respect to lead 38 tends to reduce the resultant current output of the current driver 44 cancelling to within a small error the tendency for increased current due to the increase in load. A similar sequence of events with current and voltage changes in the reverse direction will hold true for a decrease in load.

A description of the operation for regulating the current in the face of changes in the high voltage source 12, likewise follows a similar sequence of events when it is noted that wide variations in the source 12 produce very small changes in the voltage drop across the zener diode 18, and likewise cause current tendencies in the load similar to those that would occur had the load itself changed.

Operation — "Current-Off" Condition

During the time when the current regulator 10 switches "off" in order that zero current be supplied to the load 50, the input data source 56 is held at a level that is approximately equal to the low power supply level 60; thus, the output of the data driver inverter 54 is switched to a level that is low relative to the low voltage power supply level 60 insuring that approximately 25 milliamps current flows through light emitting diode 52a which is an integral part of the isolator 52.

Since the minimum current transfer ratio of isolator 52 is about one-third, the minimum current that will flow through the photodetector transistor 52b (which is the remaining component of the isolator 52) is approximately 8 milliamperes, resistor 94 notwithstanding.

It will be noted that immediately before switching, the voltage at the output of amplifier 14b (lead 46) is approximately seven-tenths below that of lead 40; thus, the input to unity-gain amplifier 14b (lead 58) is the same value and since there is no coupling current through resistor 94, this level also appears at the output of amplifier 14a, lead 96. Taking into account the voltage drops across zener diode 16b and across sense resistor 36, we observe that before switching when photodetector 52b carries no current the voltage difference between the collector (lead 59) of photodetector 52b and the output of amplifier 14a (lead 96) is at least 3.4 volts.

Upon switching, an amount of current flows from the junction 74 through the photodetector 52b into the output of amplifier 14a, lead 96, limited by resistor 94. The resulting increase in potential at lead 58 which is the input port to amplifier 14b, transmitted to the base (lead 46) of current driver 44 decreases the amount of load current in load 50 as well as the amount of current in resistor 36. The smaller value of voltage drop across resistor 36 due to this decrease in current, summed with the current set level at the arm of potentiometer 78 and applied to the input ports of amplifier 14 causes the output of loop amplifier 14a to decrease further below the approximately 3.4 volts estimated above. This decrease in voltage level draws photodetector 52b further into its active current region. This regenerative process continues until photodetector 52b saturates, whence the voltage level at junction 74 differs from that at the input of amplifier 14b (lead 58) by a few tenths of a volt. Thus, the voltage at the base (lead 46) of current driver 44 is higher than its emitter lead 40 by approximately 2.5 volts, which now inhibits current to the load 50.

During the current off[ period, a coupling capacitor 98 which is connected across resistor 94 is charged to a voltage proportionate to the sinking current of amplifier 14a. During the time when input data source 56 causes switching back to the current "on" condition of the regulator 10 by inhibiting further current through photodetector 52b, this capacitor in conjunction with resistor 94 serves to hold off the large signal drive that is at the moment present at the output of amplifier 14a from being coupled to the input port of amplifier 14b and thus preventing significant current overshoots into load 50.

Alternatively, a series combination of a one thousand ohm resistor and a zener diode such as the type of diode 18 (FIG. 2) may be connected across feedback resistor 92 to achieve the same result, at the expense, however, of lowering the upper limit of current adjustment.

It will be noted by those skilled in the art that a certain amount of current overshoot may be desirable when the load 50 is inductive and the variation of capacitor 98 could be employed to satisfy this and other applications.

PRACTICAL OPERATION

In operation the current level is initially set in the following manner. Input data source 56 is intentionally held at a relatively low level insuring that data driver 54 draws zero current through the low voltage power supply 60 and the light emitting diode 52a. This absence of current in the diode 52a ensures that the photo-transistor detector 52b is essentially open and that no part of the potentional at junction 74 reaches the input port of amplifier 14b (lead 58). A shorting wire is placed between lead 48 and the battery ground 100 before the unit is connected to a load 50. Jack-assembly 90 is utilized together with meter 88 to monitor the short circuit current. The operator adjusts potentiometer 78 until the short circuit current is that specified for the actual load. The load 50 is then substituted in place of the shorting wire between lead 48 and battery ground 100. Due to the regulating action that was described above, it should now be obvious that regardless (within operating limits) of the distance of the load 50 from the regulator 10 or the magnitude of load 50 (with operating limits) the current supplied to the load will remain at the same values as was originally set by means of the current set control 32 (FIG. 1) or potentiometer 78 (FIG. 2) in conjucntion with meter 88 and jack-assembly 90.

The digital signalling from input data source 56, results in sufficient currents in photo transistor detector 52b to bring the potential at junction 74 to lead 58 at the input port of amplifier 14b. This causes driver 44 to restrict further current to the load 50, thus readily transmitting the digital signal in the form of regulated current and zero current.

It will be noted that the highest potential to which the output of amplifier 14b (lead 46) attains is 2.7 volts below its high voltage power supply input port 20b. This insures that operating the amplifier 14b in the mode set forth above will not cause "latching." It will also be observed that the largest back bias attained between the base lead of current driver 44 (lead 46) and the emitter of current driver 44 (lead 40) is similarly 2.7 volts. This is necessary in order to comply with the relatively low base to emitter breakdown voltages associated with high voltage, high power transistors of the type employed.

It is to be understood that the above described arrangements are illustrative only of the several specific embodiments which can represent applications of the principles of the invention. Thus numerous and varied other arrangements may be readily devised by those skilled in the art without departing from the spirit and the scope of the invention.

What is claimed is:

1. In a regulated pulsed current telegraph adapter for use in transferring digital data from low level voltage devices to those requiring substantially high regulated current, the combination comprising:
   a. A current-level control adapted to be manually operated;
   b. A current sensing resistor;
   c. A loop amplifier responsive to the current level control and the current sensing resistor;
   d. A series string of constant voltage zener diodes providing a plurality of current level controls;
   e. An emitter follower auxiliary power source for said loop amplifier;
   f. A current driver fed by the loop amplifier;
   g. Said current driver being directly connected to the load so as to control current through the same;
   h. An optical isolator for coupling data from a low voltage data source to the loop amplifier to transmit the pulsed signals into the loop amplifier and by means of the current driver directly into the load.

2. The combination claimed in claim 1 wherein,
   a. Said current sensing resistor is a relatively low voltage resistor carrying the total load current; and
   b. Said loop amplifier consists of a first stage and a second stage;
   c. The first stage being connected in the differential mode and the second stage connected as a voltage follower; and
   d. The first two zener diodes in said string operating in conjunction to ensure the functioning of the loop amplifier by providing a plurality of current level controls and functioning to maintain a constant voltage drop over a wide current range to adequately insure the current driver being cut off; and
   e. One of the diodes in the string functioning as a reference for the current level controls, and
   f. A remaining zener diode, in conjunction with the other member of said series string functioning as a reference for the emitter follower power supply;
   g. An unregulated high voltage source directly connected to the power ports of said loop amplifier, and to the first diode in said diode string, and
   h. Said optical isolator being connected to the second stage of the loop amplifier to regeneratively control the current driver.

3. In a pulsed current telegraph adapter the combination comprising,
   a. A current-level control adapted to be manually operated;
   b. A current sensing resistor;
   c. A loop amplifier having a first stage and a second stage responsive to the current level control and the current sensing resistor;
   d. A series string of constant voltage zener diodes providing a plurality of current level controls;
   e. An emitter follower auxiliary power source for said loop amplifier;
   f. A current driver fed by the loop amplifier;
   g. An optical isolator for coupling data from a low voltage data source having a separate ground reference to the loop amplifier having a different ground reference, and
   h. Said optical isolator being connected to the second stage of the loop amplifier to regeneratively control the current driver.

4. The combination claimed in claim 3 wherein current overshoots from the current driver may be obtained by decreasing the value of a coupling capacitor's time constant by reducing the coupling resistor value between said first stage and the second stage of the loop amplifier.

5. The combination claimed in claim 3 wherein current overshoots from the current driver may be obtained by decreasing the value of a coupling capacitor between the first stage and the second stage of the loop amplifier.

6. The combination claimed in claim 3 wherein current overshoots from the current driver may be eliminated by a series combination of a one thousand ohm resistor and a zener diode connected across a feed back resistor between said first stage and the second stage of the loop amplifier.

7. The combination of claim 3 wherein the means for pulsing the current driver embody the use of the potential existing at the junction of the first two zener diodes in said string and conducting the same, by means of saturating said optical isolator, to the second stage of the loop amplifier, to protect against the breakdown of the base emitter of the current driver.

8. The combination of claim 7 wherein the connection of the second zener diode to the first stage of the loop amplifier by means of the current sensor ensures said loop amplifier against latching.

9. The combination of claim 7 wherein the connection of the junction of said two zener diodes by means of said isolator results in regenerative action during pulse turn-off.

* * * * *